United States Patent [19]

Zamzow et al.

[11] Patent Number: 4,712,511
[45] Date of Patent: Dec. 15, 1987

[54] PROGRAMMED MIX AND DELIVERY SYSTEM

[76] Inventors: Donald D. Zamzow, P.O. Box 358; George L. Gorski, P.O. Box 358, both of Wausau, Wis. 54401

[21] Appl. No.: 765,945

[22] Filed: Aug. 15, 1985

[51] Int. Cl.$^4$ ............................................. A01K 5/02
[52] U.S. Cl. ........................... 119/51 R; 119/52 AF; 119/52 B
[58] Field of Search ............... 119/51 R, 52 AF, 52 B

[56] References Cited

U.S. PATENT DOCUMENTS

| | | | |
|---|---|---|---|
| 3,116,716 | 1/1964 | Sime | 119/52 B |
| 3,557,757 | 1/1971 | Brooks | 119/51 R |
| 4,162,683 | 7/1979 | Brooks | 119/52 AF X |
| 4,517,923 | 5/1985 | Palmer | 119/51 R |

FOREIGN PATENT DOCUMENTS

8001231  6/1980  PCT Int'l Appl. ............... 119/52 B

*Primary Examiner*—Robert P. Swiatek
*Attorney, Agent, or Firm*—Lowe Price Leblanc Becker & Shur

[57] ABSTRACT

A feed delivery system for individualized rations for specific livestock includes a programmable controller responsive to status of the livestock. Individual elements of a feed ration are combined to meet the requirements of a specific animal and delivered only to that animal. Plural delivery containers may each be loaded with different rations for different animals. The inventive concept may also be used for delivery of food to hospital patients having different dietary requirements, for delivery of different components to various worksites in a manufacturing process, or for delivery of chemicals to a chemical process.

20 Claims, 11 Drawing Figures

PROGRAMMED MIX AND DELIVERY SYSTEM

TECHNICAL FIELD

This invention relates to delivery systems, and more specifically to systems for providing predetermined customized feed rations to livestock in accordance with specified conditions of the animals. In a more general sense, the invention pertains to systems for delivery of any customized combination of elements to particular receptacles therefor, such as systems for distribution of hospital food, delivery of components to a production line, or delivery of specific chemical mixtures to predetermined points in a chemical process.

BACKGROUND ART

Prior art systems for delivery of forage or feed rations to livestock are known. However, these prior systems are limited to delivering grain concentrate only, or may require livestock to be physically grouped by production category. Such systems are not able to provide a total mix ratio of grain and forages individually mixed for the requirements of each individual animal. Thus, in prior art feed delivery systems it is frequently the case that a feed mixture provided to any one animal may not be the most efficient or most healthful mixture or quantity for that particular animal, although the mixture may be quite adequate for an average animal.

In one prior art system there is disclosed an individualized system in which each animal is provided with an identification tag. A tag reader is associated with a feed station, and as each animal reaches the station, its identification tag is read and a feed quantity controller is responsive thereto in order to provide an individualized quantity of feed mix to the specific animal. Such a system is deficient, however, in that cows, for example, must be released from their stalls for feeding, making it impossible to conduct an efficient in-stall operation. Moreover, by bringing the animals to a feed station the animal is given control over both the components and quantity of the total ration to be consumed, and a farmer loses control over the total ration intake for specific animals. Additionally, specific conditions may require the provision of individual mixtures to an animal as a result of particular states of health, weight, age, production, gestation or lactation of the animal, for example.

Moreover, the prior art fails to teach systems which can provide a varying number of feedings or a varying mixture to a particular animal, the quantity and contents of each ration being determined in accordance with the animal's condition.

There is thus a need in the prior art for a system capable of delivering an individualized total mix ration to a particular animal a specified number of times during a particular time period.

There is a further need for such a system which provides individual rations to specified stalls housing the animals, and which permits manual override of the machine determined rations to reflect each individual animal's metabolism rate (ability to consume and convert feed to milk) and adverse weather conditions on a global basis since cows, for example, cannot eat as much when under heat stress.

There is a more generalized need for a system capable of delivering individualized quantities, combinations, mixes, or blends of component elements to specific receiving stations, or stalls, whether in conjunction with animal feed delivery, hospital food distribution, or industrial processes.

DISCLOSURE OF INVENTION

It is accordingly a primary object of the present invention to provide a feed delivery system overcoming the difficulties of the prior art.

It is another object of the invention to provide a delivery system for individualized quantities, combinations, mixes or blends of individual elements, forming specified rations, to specific receiving stations therefor in accordance with condition status at the receiving stations.

It is a more specific object of the invention to provide a feed delivery system controlled by a programmable controller, which may be connected to a separate management computer, to provide individual rations of separate feed components or of a total feed mix to individual animals.

Yet another object of the invention is the provision of a delivery system, for feed or other rations, including a capability for changing the rations provided to a particular stall in accordance with the changing status and requirements at the stall, whether due to changing status of an animal or to changing requirements of an industrial process.

It is still another object of the invention to provide a feed delivery system capable of delivering an individualized number of rations to individual animals.

Yet a further object of the invention is the accommodation of time related changes in status of an animal's ration requirements, as dictated by a control computer or by manual entry, by variation of the feed ration provided thereto.

It is another object of the invention to provide a delivery system controlled by a programmable controller, and including an input device permitting a user to override preprogrammed rations for a receiving stall in accordance with observed conditions thereof.

Still a more specific object of the invention is the provision of a controller including a storage area for correlating livestock identification with specified feed rations.

It is a further object of the invention to provide a feeding apparatus for delivering a specified ration to a specific livestock stall including a feed delivery system responsive to a programmable controller interfaced with a control computer or with manual key entry.

It is yet another object of the invention to provide a programmable delivery system in which a motive structure is responsive to a programmable controller for moving a container to receive specified mixtures and in which a discharge controller is responsive to the programmable controller by causing the container to discharge the specified mixture only at a specific stall.

In accordance with the foregoing and other objects of the invention, there is provided a feeding apparatus which includes a feed mixing device, a feed delivering device and a programmable controller which provides first and second signals for controlling the mixing and delivering devices to deliver a specific mix of feed elements to specific livestock. The feed mixing device is operable for combining selected quantities of selected feed elements to form the specified mix and to provide the same to the delivering device. Various control signals may by input manually or by a separate management computer.

In accordance with another aspect of the invention, there is provided apparatus which includes a delivering device and a programmable controller which generates control signals to cause the delivering device to deliver a specified ration to a specific stall. The delivering device of the invention includes a container which is movable among a plurality of stalls in order to deliver the specified ration only to the specific stall. A motive device is provided, responsive to the control signals, for moving the container first to receive the specified rations and secondly to the location of the stalls. A discharge controller is also provided, and is responsive to the control signals for discharging the container only at the specific stall. Preferably, the feeding apparatus includes a combiner responsive to further control signals from the programmable controller in order to combine selected quantities of individual elements to form the specified ration and to provide the same to the delivering device.

Another feature of the invention includes a storage area in the programmable controller for data correlating specific stalls with specified mixes and rations. Preferably, the delivering device delivers the specified ration or mix to a specific stall, as identified by the correlating data in the storage.

For a feed delivery embodiment of the invention, an input device may be provided for inputting livestock status information to the controller. The controller generates mix and ration control signals in accordance with the livestock status information input thereto. The input information may be provided by a separate management computer or may be manually entered.

A timer may be provided for determining any status changes at the receiving station which are substantially time responsive, such as animal pregnancy condition, production or lactation stages. The controller is responsive to the changes in status data by producing approprite signals for changing rations specified for specific livestock.

In yet another feature of the invention, there may be provided a second input device for generating override signals, under manual control. The controller is responsive to such override signals by changing the specified rations for the stalls either individually or globally for all the stalls.

Still a further aspect of the invention is a method for operating a programmed feeding apparatus to provide the above described features thereof.

These and other objects, features and advantages of the invention will become apparent to those skilled in the art upon reading the following description of the invention. The invention is described therein in terms of a preferred embodiment for carrying out the inventive concept. However, such embodiments are illustrative only and are not limitative of the invention. Thus, various changes in the invention, including but not limited to other aspects and embodiments of the invention, will occur to those skilled in the art. All such changes and modifications are intended to be covered by the attached claims, when interpreted to provide the broadest protection to which the applicant is legally and equitably entitled.

BRIEF DESCRIPTION OF THE DRAWINGS

The foregoing objects, features and advantages may best be understood in conjunction with the following specification and claims, when taken together with the drawings wherein:

PREFERRED EMBODIMENT FOR CARRYING OUT THE INVENTION

Figure 1:
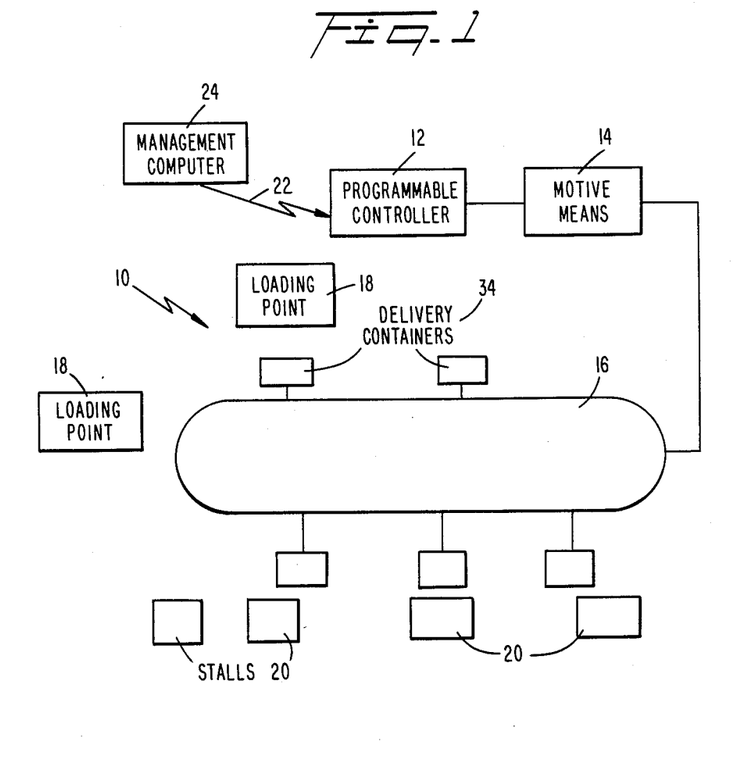
FIG. 1 broadly illustrates a concept of the present invention.

In accordance with the preceding summary, objects and advantages of the present invention, there is provided at FIG. 1 a distributing apparatus, generally shown at 10, which is particularly useful for distribution of specified feed rations to specific livestock, in which a programmable controller 12 provides control signals to a motive means 14 for controlling a delivery system 16 operable for transporting a feed ration from one or more loading point(s) 18 (wherein the several elements of the specified feed mix are provided) to a plurality of receiving structures, or stalls 20.

The programmable controller 12 incorporates a programmable computer which, independently, may be programmed to perform a number of timing and other computational chores. Alternatively, the programmable controller may receive separate input signals 22 from a central, or host computer, identified in the figure as a management computer 24, programmed to perform the various chores and which may be remote from the programmable controller. The signals 22 may, alternatively, be manually input via a keyboard, not shown in FIG. 1. For a feed delivery system, the programmable controller 12 (or the management computer 24) preferably keeps track of the various physiological states of the individual livestock, such as weight, pregnancy, lactation, age, illnesses, milk production and the like. In accordance with these status variables, a specified feed formulation may be obtained from a look-up table, for example. Alternatively, the feed formulation may be computed where individual computational algorithms are available.

The delivery system preferably includes a number of individual containers 34 which, under control of the programmable controller, are moved to particular loading points 18 to receive the various elements of the feed mix and, thereafter, to identified stalls 20 of the specific livestock to deliver the individually mixed ration thereto.

In that regard, it is noted that the various elements of a feed mix are combined and preferably mixed thereafter to provide a homogeneous mixture. However, the specific mixing arrangement is not a necessary part of the present invention. Thus, the present invention provides a structure for obtaining at the various loading points 18 the individual elements of the mix to be delivered. The various elements of the mixture are combined in accordance with the status of the receiving livestock to form the specified mix ration to be delivered to the specific stalls 20. However, it should be noted that the individual elements may be combined, as by being dumped into a common container, or may be mixed by a separate mixing means to provide a substantially homogeneous mixture. In the following description, the terms "mix" or "mixture" should be understood to refer to either form of combination or homogenous mix of elements.

From the above description it should be recognized that the inventive system may be used to deliver a feed ration mix to livestock, to deliver particular chemical components to a chemical process, to deliver needed mechanical components to a particular manufacturing station, or to deliver food to particular patients at a hospital, without substantial modification of the inventive concepts. It should thus be understood that the following description, in terms of a livestock feed delivery system, is illustrative only and may be used in other applications in accordance with the foregoing comments and that the claims appended hereto are to be similarly interpreted.

Figure 2:
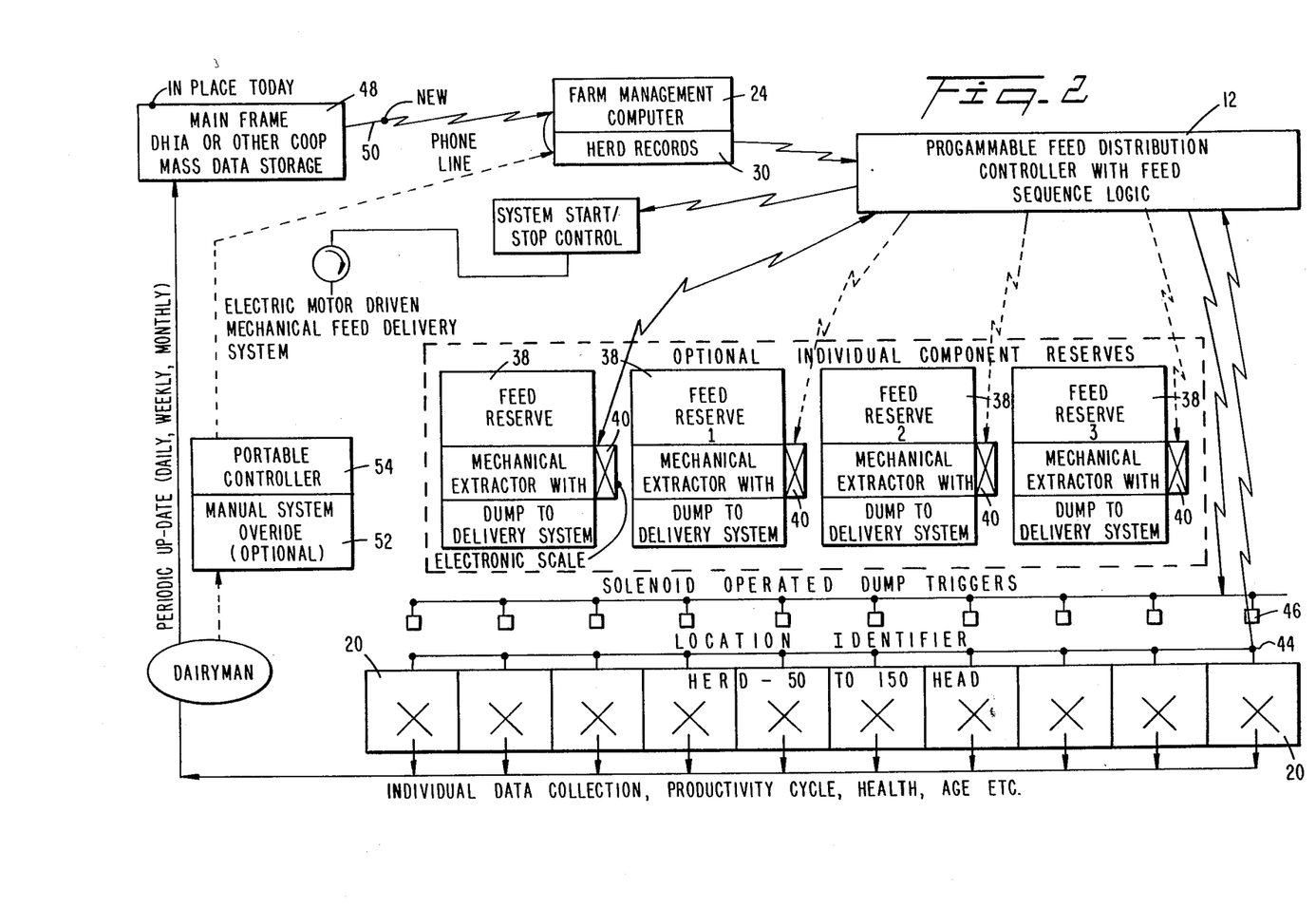
FIG. 2 symbolically shows an interaction between control elements and structural components of the invention.
Figure 3:
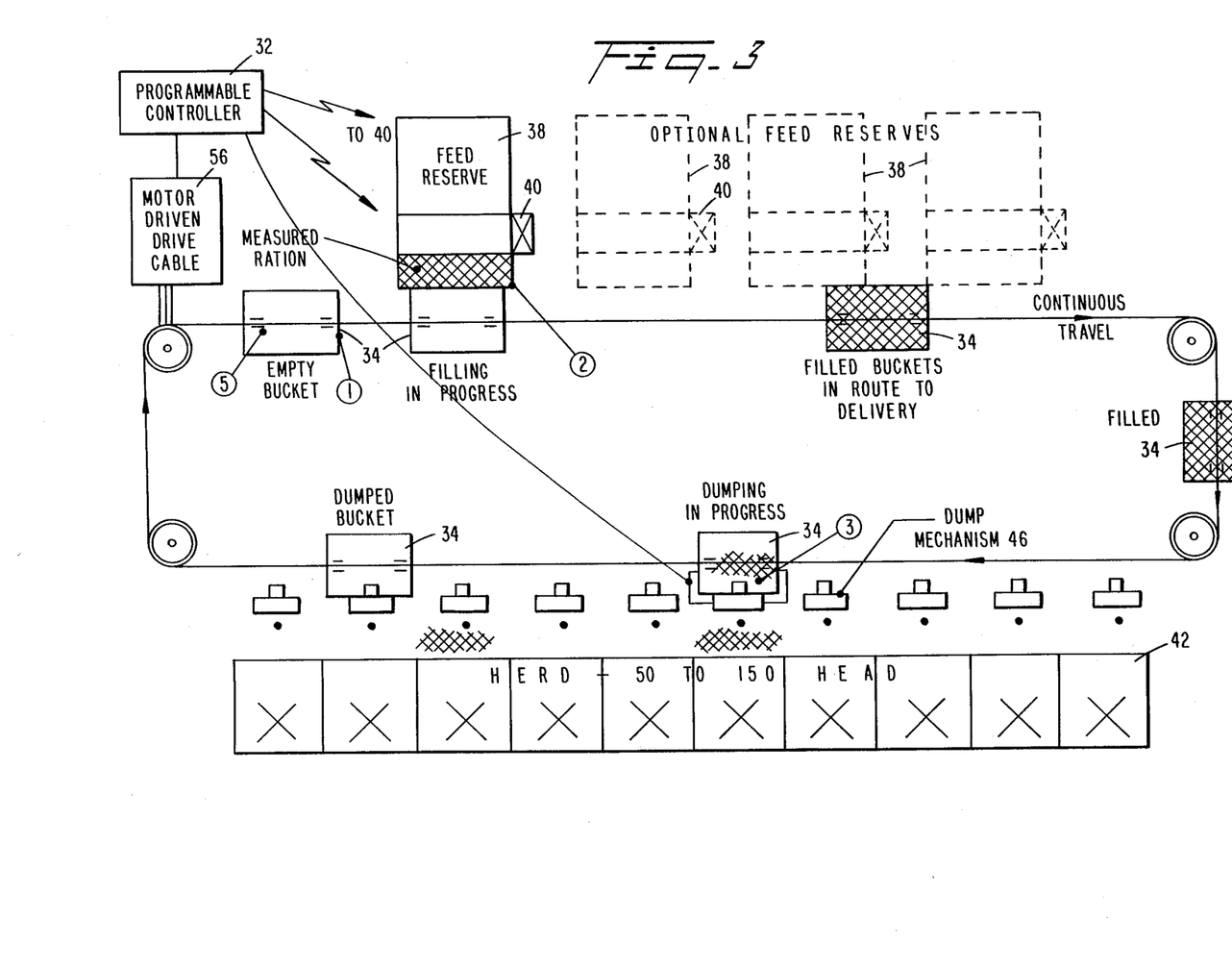
FIG. 3 illustrates additional detail of the structural arrangement of the invention.

Referring now to the illustrative embodiment of FIG. 2, the invention is shown as including the management computer 24, which includes a storage 30 for maintaining records of a specific cattle herd, for example, and for correlating the records of any individual animal and appropriate feed mix requirements for the animal. The programmable controller 12 is provided particular signals from management computer 24 to govern movement of one or more containers 34 to various feed reserves in the system, as shown in FIG. 3.

Thus, as shown in FIG. 2, there may be provided a plurality of feed reserves 38 for individual elements of a feed ration needed for preparation of a total mix ration (TMR) or for individual distribution. Under control of signals from the subservient controller 12, a number of extractors 40, associated with respective reserves, may be triggered to open for appropriate times or for appropriate opening dimensions to provide (FIG. 3) to a container 34, or bucket, appropriately computed or "looked-up" ratios of the feed elements to form a specified feed ration. Thus, as a container, or bucket, arrives at a particular feed element reserve the necessary quantity of that feed element is discharged into the container to form the mix for a specific animal. After traversing each of the reserves 38, a container 34 is thus loaded with the specified combination of feed mix elements for the specific animal for which the mix is intended.

The filled container travels further until arriving at the stalls 20 of the specific animals intended to receive the specified feed ration mix. Thereat, location identifiers 44 generate signals which are transmitted to the programmable controller 12 via sensors (not shown) associated with the containers 34. Upon detecting location of the container at a specific stall designated to receive the specified mixture carried by the container, controller 12 generates a control signal to an appropriate solenoid operated dump trigger 46, located at the specific stall.

Of course, the system may operate by generating a dump trigger signal to a specified one of the dump triggers in an open loop fashion, independently of detection of arrival of the container 34 thereat. The signal may remain active with or without confirmation that the travelling container has, indeed, been triggered to dump its contents. Alternatively, the system may be programmed to operate in a feedback manner. Thus, if only one container is travelling at any one time, all dump triggers may be activated by a single signal upon detection of the container presence at the specific stall. In still another variant, the system may be operated by providing an activating signal to the travelling container, causing engagement with a tripping mechanism at the specific stall. These or other approaches known to those of ordinary skill in the art may be used to obtain discharge of the contents of the container at the specific stall by activation of the appropriate dump triggers 46, or other mechanism.

Accordingly, a specified mix of feed ration elements may be provided to a specific stall by controller 12 in accordance with the particular conditions of livestock associated with that stall as stored in storage 30.

As hereinabove described, the mix may be specified in accordance with physiologic conditions of the animal at the stall. Such conditions may include weight, age, and the like. However, several conditions, such as age, stage of pregnancy of the like, once initiated are time dependent in a predictable manner and need not be continuously monitored. Instead, data representing such conditions may be updated in accordance with a time clock. Thus, either the programmable controller or the management computer may include a time counter, or clock. Some of the data in storage 30, relating to several of the above mentioned conditions, may thus be modified periodically in response to the count in the timer and the feed mix specified for the particular animal appropriately changed.

Additionally, the mix may be varied in accord with milk quality of a particular cow. Thus, a dairy cooperative, such as Dairy Herd Improvement Association (DHIA), which samples and tests milk for weight and quality per individual cow, may provide data representing computerized test results from a remote main frame computer 48 to the management computer 24 via a telephone hookup, as shown at 50, or otherwise. Alternatively, actual milk production of an animal may be manually or automatically monitored and stored in the management computer. The particular mix for a specific animal may thus be varied as frequently as data are available pertaining to changing stall or animal conditions, such as quality of milk output.

Moreover, up to date conditions of a particular animal may be incorporated into feed mix determination by personal observations of a dairyman. Thus, as shown at FIG. 2, a dairyman may input via a keyboard, or other manual input device, data indicative of current conditions of the animal being fed. More specifically, an optional manual override system 52 may be provided to the diaryman for periodic herd inspections. Upon detection of particular conditions affecting feed mix, for example, the dairyman may input the data through a keyboard associated with portable controller 54. The controller may be a simplified keyboard, generating data signals for input to the programmable controller 12. Alternatively, as known in the art, controller 54 may be a "smart terminal" which may thus be programmed to determine the changes necessary in feed mix in accordance with input data pertaining to the specific animal. Such a terminal may be used to transmit the necessary changes directly to the controller 12 for implementation without need for further complicating the control program of controller 12.

Periodically, as prestored forages of various compositions are encountered, the dairyman may access a ration balancing program in his own management computer or in a time-shared computer utility such as the University of Wisconsin Badger Balancer, to rebalance the rations in accordance with changing forage qualities. This will also result in new mixes being computed for each cow.

Referring specifically to the details illustrated in FIG. 3, it is seen that in the preferred embodiment motive means 14 includes a motor driven drive cable 56, controlled by the programmable centroller 32, for moving a plurality of buckets, forming containers 34, in a loop between the feed reserves 38 and the stalls 20. In response to data stored in storage 30 pertinent to a specific stall, to data provided by external sources, such as the remote main frame computer 48 or management computer 24, and to manually input data provided by portable controller 54, controller 12 generates specified commands to the motive means 14 and extractors 40 for collecting in one of the buckets 34 specified quantities of feed elements from specified ones of reserves 38. Additionally, a dump trigger 46 for the specific stall is activated to trigger discharge of the proper bucket upon passage at a location identified by identifiers 44 (FIG. 2) as that of the specific stall.

Thus, the proper bucket containing the specified feed ration mix is caused to discharge its contents precisely at the specific stall for which the mix is intended. Simultaneously, other buckets driven by the motor driven drive cable are passing the various feed reserves 38 and the several stalls 20. Controller 12 and the motive means 14 are provided with sufficient capacity to control formation of a plurality of feed mix charges in a plurality of containers and to discharge appropriate containers at specific stalls.

The present system thus functions to provide continuing discharge of individually mixed rations at specific stalls, in accordance with predetermined and varying conditions.

Figure 4:
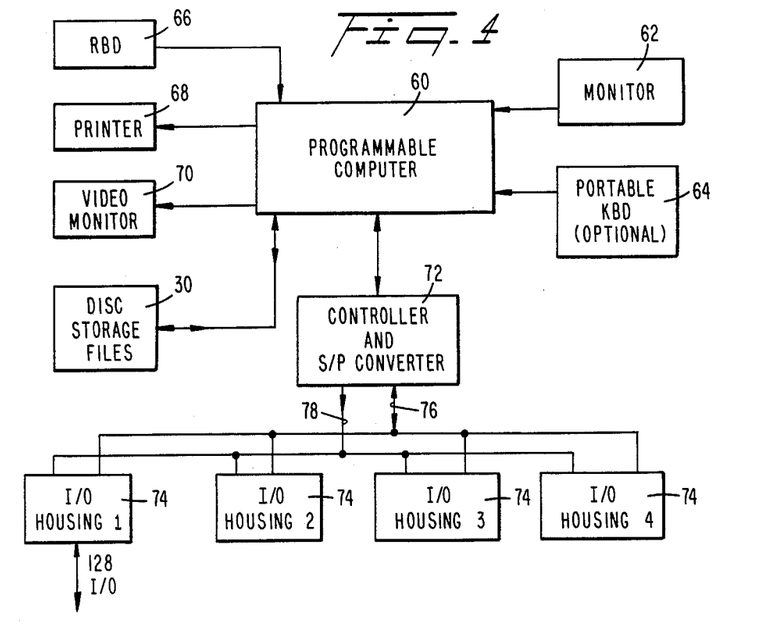
FIG. 4 shows a schematic arrangement of the programmed controlled used in the present invention.

Referring now to FIG. 4 there is shown a schematic layout for a computer controlled delivery system in accordance with the present invention. As shown therein, the management computer 24 includes a programmable computer 60 which performs various computations, displays, data manipulation, and provides miscellaneous input-output communication and control.

Computer 60 may be sufficiently powerful to perform all needed tasks in a single microprocessor facility. Alternatively, the computing facility may be formed of a cooperative interconnection between the previously described management computer and the programmable controller. It should be understood that all further references to "computer" may be realized by either of the above described arrangements, or by any other arrangement known in the art.

Storage 30 is provided in the form of disc storage, although any form of storage may be used. The disc storage stores age, condition, lifetime production, lactation stage and other data relevant to the animals in the particular receiving stalls, and further stores tables identifying the various rations of specified feed elements to be provided to an animal in accordance with the above described parameters. Additional information, in the form of tables identifying particular feed mix available for distribution and the individual feed elements therein, together with the individual and cumulative amounts distributed to the livestock, may also be stored by rotating media associated with the disc drive. Alternatively, such operating tables may be stored in the internal storage of computer 60 (not shown) to avoid repeated transfer of these often used data between external storage and internal computing circuitry.

A condition monitor 62 is shown separately to provide information pertaining to changes in livestock status, while an optional portable keyboard 64 may be provided for manual input of various data as previously explained. A fixed keyboard 66, a printer 68 and a video monitor 70 are associated with the computer to provide standard input-output communication. An input-output controller 72 is used to prepare input data from a plurality of I/Q housing units 74 for operation by computer 60 as well as to convert internal signals of the computer to appropriate output control signals.

The computer receives and transmits data from and to I/O units 74 on a bidirectional 16 bit data bus 76. A separate 24 bit bus 78 is used to access specific I/O cards within the housings, or specific data lines within the cards. Bus 78 conveys address and control information to the I/O cards and further serves as a power bus therefor. Controller 72 provides parallel-serial conversion and may also provide power level conversion.

Each I/O housing includes an address decoding circuit to convert the address signals on bus 78 to actual contact with specified lines and 16 I/O cards each of which may have 128 wire connections. Analog input cards are provided to input to the computer feed scale data associated with feed being readied at reserves 38 for discharge to the buckets, as well as temperature, moisture, pH data and the like. Digital input cards are used to provide to the computer BCD (binary coded decimal) bucket and stall identification data as well as system reset, start and stop signals.

Digital output cards are provided to activate various warning lights, to drive motors and feed augers associated with the motor driven drive cable system for moving the containers, and to activate the appropriate dump triggers 46 when a bucket is at the appropriate stall.

Information arrangement, flow and processing in the inventive system is described in the illustrations of FIGS. 5-11.

Figure 5:
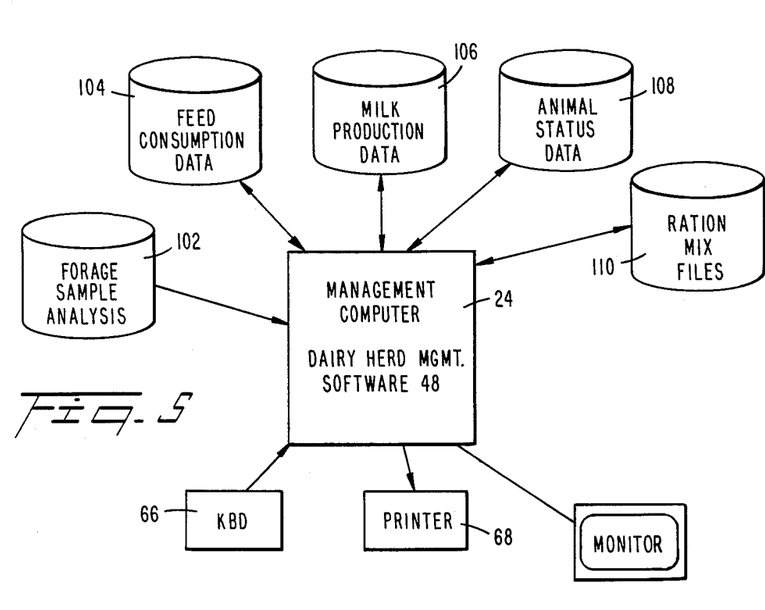
FIG. 5 shows an arrangement of information files and interconnection of the same in support of the inventive feed delivery system.

As shown in FIG. 5, the information system supporting the inventive feed delivery system includes an interconnection between the management computer 24 (and/or the DHIA data storage 48) and a number of data files 102, 104, 106, 108, and 110, respectively pertaining to: forage sample analysis results, which may be available from a forage testing laboratory; feed consumption data fed back from the feed delivery system; milk production data from the DHIA cooperative, from self test and weighing or from automated milk monitoring system; animal status data maintained by daily updating by the dairyman; and computed rationed mixes. As previously shown in FIG. 4, the management computer is also connected to keyboard 66, printer 68 and video monitor 70.

It is recognized that the complexity of the delivery system may be reduced by elimination of any information systems software so that ratio mix and animal status data are maintained manually on an off-line basis, and by periodic (e.g., daily or weekly) keyboard entry of changing requirements, so that the computer is required to control only the feed delivery rather than the ration mixing.

As hereinabove mentioned, the forage sample analysis data kept in file 102 may be used in conjunction with an outside software service for balancing the forages on hand with the necessary grains, concentrates and minerals in order to obtain maximal nutritional value from the forage for each set of existing conditions. Such software may reside in the dairyman's computer or in a time shared utility for remote access, as available from The University Of Wisconsin, for example. Thus, after processing of the data in forage sample file 102, ration mix adjustment may be provided to the management computer for modifying the data in ration mix files 110. The dairyman may select the number of different rations with which he prefers to work and the software system provides matrices for each ration mix, including variables, for storage in files 110.

Figure 6:
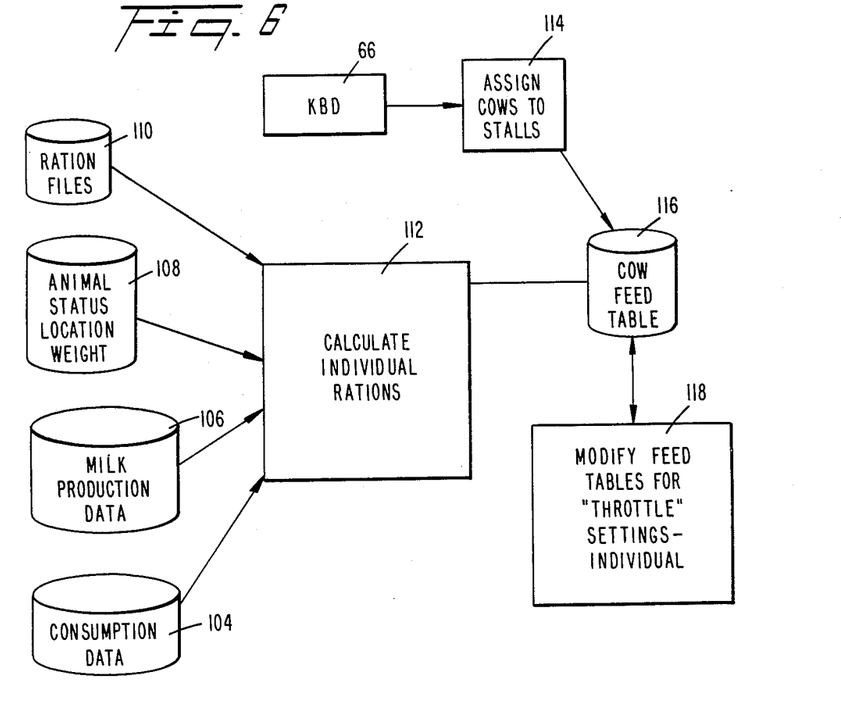
FIG. 6 illustrates an interaction among the information files of FIG. 5 to control the amount of feed to be delivered by the system.

Adjustment of the amount of mix to be provided to each animal may be performed in accordance with the illustration of FIG. 6. Therein, individual rations are calculated at 112 based on data and the updated ration files 110 together with information from files 104, 106 and 108. Identification of particular animals with individually identified stalls is performed by keyboard input to an identification table 114. This data is combined with the calculated individual rations for entry in a cow-feed table 116 so that the proper total mix ration may be created under control of the management computer by the structure shown in FIGS. 2 and 3. Advantageously, the dairyman thus controls distribution of the proper mix to the animals rather than permitting the animals to pick and choose consumption quantities of grain versus forage. An electronic "throttle" is provided at 118 to permit a dairyman to vary the amount of mix distributed to each animal in accordance with the animal's ability to consume the same, thus achieving maximum productivity and minimizing waste. Upon throttling, or varying, the quantities of mix to be provided each animal, the data is returned to the cow-feed table 116.

The cow feed table maintained by the present system includes a different record for each stall, including the animal and stall identification and a numerical indication of stall location, along the travel path of the buckets. For each of the feed elements in the feed reserves 38 two entries are provided. The amount of the element to be included in the specific individualized mix to be delivered to the stall is entered as well as a status indicator for the extracting mechanism delivering the feed to the bucket. The status of each extractor is indicated by E for empty, F for full, and D for dumped to bucket. A bucket number entry identifies the next bucket available for assignment to the particular stall and a bucket status indicator identifies whether the bucket is E (empty), F (full), or T (tripped and dumped to stall). An overlap indicator is set if the stall is within the loading range of the bucket, i.e., the bucket must make another revolution around the loop in order to be loaded with each of the feed elements since some elements may be stored beyond the stall location. Finally, the table includes (for each stall) a trip indicator, to indicate whether the dump trigger 46 associated with the stall has been activated to an on (O) state or whether the trigger is off (F).

Various modifications may be provided for the data in the cow-feed tables 116 to take into consideration global environmental variations which tend to affect either quantity or mix ratio of feed provided to all of the animals being fed. For example, under heat stress the ability of an animal to consume is reduced so that quantities to be delivered to all animals, as noted in the "amount" entries for each of the feed elements in the table, would be reduced. A shortage of one or more feed elements may require that smaller amounts of those elements be distributed to each animal. Thus, in addition to throttling the data in the cow-feed table to correspond to each animal's individual ability to ingest the feed, illustrated in FIG. 6, additional modifications may be performed.

Figure 7:
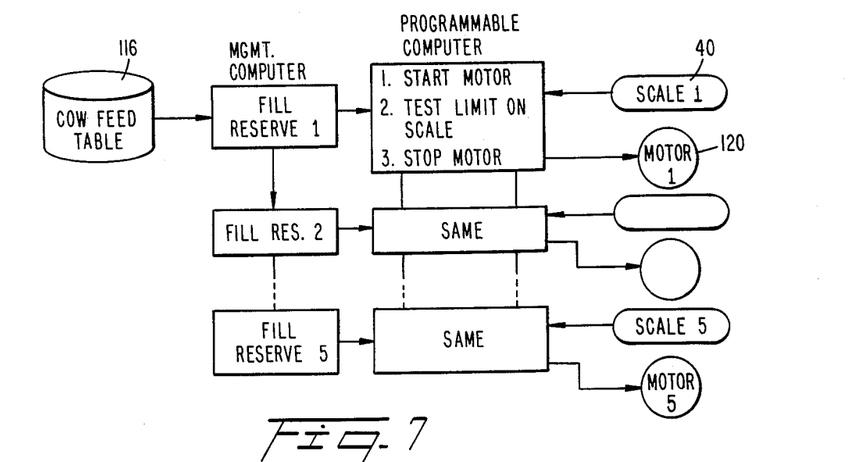
FIG. 7 illustrates a sequence of steps performed in filling feed reserve bins in accordance with the invention.

FIG. 7, shows the sequence of steps performed to fill each of a number of feed reserves 38 utilizing data from the cow-feed tables 116, under control of the management computer 24. The system may operate in a multiple control mode in which multiple devices are simultaneously controlled, with cyclic polling of various sensors associated with the devices. Thus, for each feed reserve a fill cycle is carried out wherein the total weight of that feed type needed by the animals is determined by the management computer. Under control of the programmable controller, fill motors 120, individually associated with reserves 38, are started. Scales 44, respectively associated with the individual reserves, are tested by the programmable controller to determine whether the total weight for the particular reserve has been loaded. Upon determination by the programmable controller that the weight limit has been attained, the associated fill motor is stopped. While any of the operations is being performed the system may interrogate the other reserves, scales, motors, etc., to determine whether the reserves are filled and to start or stop the motors as necessary. The next reserve is then to be filled.

Figure 8:
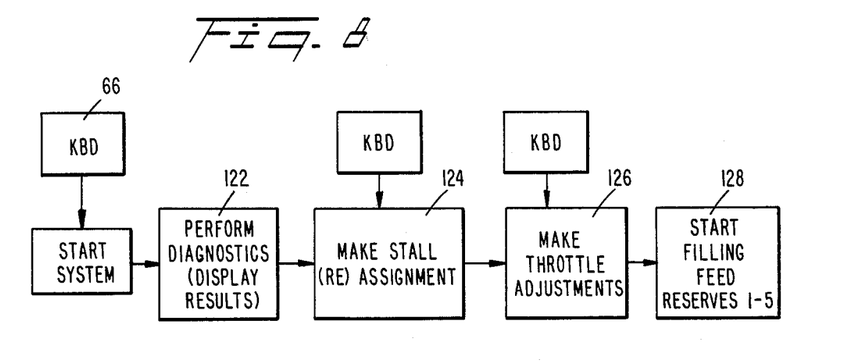
FIG. 8 shows the steps performed in initializing the inventive system.

Start-up of the system is illustrated at FIG. 8, wherein a diagnostic program is performed at step 122 to start the bucket conveyor, test the various trips and dumps, and display the results of the test. At step 124 various animal and stall assignments and reassignments are made via input from the keyboard. Thus, the animal identification entry of a particular stall record may be modified to take death or sales of animals into account and to recognize moving an animal to a different stall. Step 126 provides for the throttle adjustments previously described. Such adjustments may be made by the dairyman as follows. Before starting the system the amount of feed left by each animal is observed and marked appropriately on a check list. After passage of sufficient time (perhaps 3–5 days) to establish a pattern, the adjustment may be "throttled" by one increment and the observations continued for several additional days. Filling of the feed reserves in accordance with FIG. 7 is begun with step 128.

Figure 9:
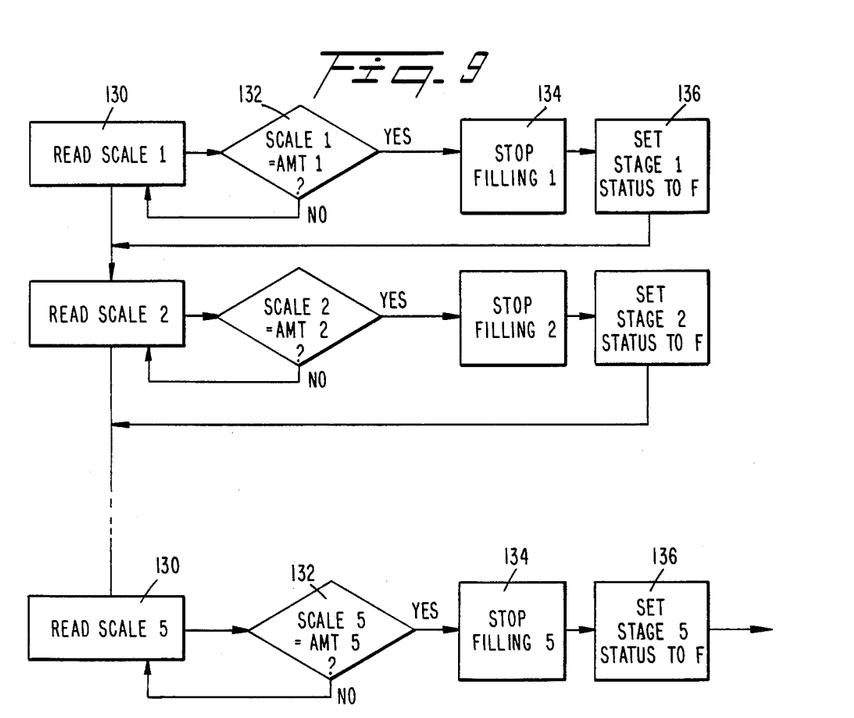
FIG. 9 shows the steps associated with measurement of individual elements forming a ration mix.

FIG. 9 illustrates the steps associated with measurement of the individual elements forming an individual ration mix for a particular animal. The appropriate quantity of each feed element is obtained from the feed table by the management computer 24 and provided to the controller 32. The procedure for extracting each of the feed elements for discharge into the bucket 34 is the same, and is shown in FIG. 9 as including a step 130, wherein an amount of the feed element is extracted from the reserve for discharge to the bucket and the associated scale 44 is read to determine the cumulative amount of feed element thus far extracted. At step 132 the scale reading is compared with the amount of the feed element to be discharged to the particular bucket for the particular animal. If the scale reading is less than the required amount the procedure repeats steps 130 and 132. When the required amount has been extracted, further extraction is stopped at step 134 and the extracting mechanism indicator in the feed table is set to F at step 136, thus identifying presence of a full ration of the particular feed element in the scale. Since the system operates in a polling and looping mode in which each of the extracting mechanisms for the various reserves is read essentially simultaneously, each of the sequences of operation shown in FIG. 9 is performed essentially simultaneously. Once all of the extractors are appropriately filled, the system performs the next sequence of steps, shown at FIG. 10, in which the extracted amounts of the various feed elements are discharged to the particular bucket.

Figure 10:
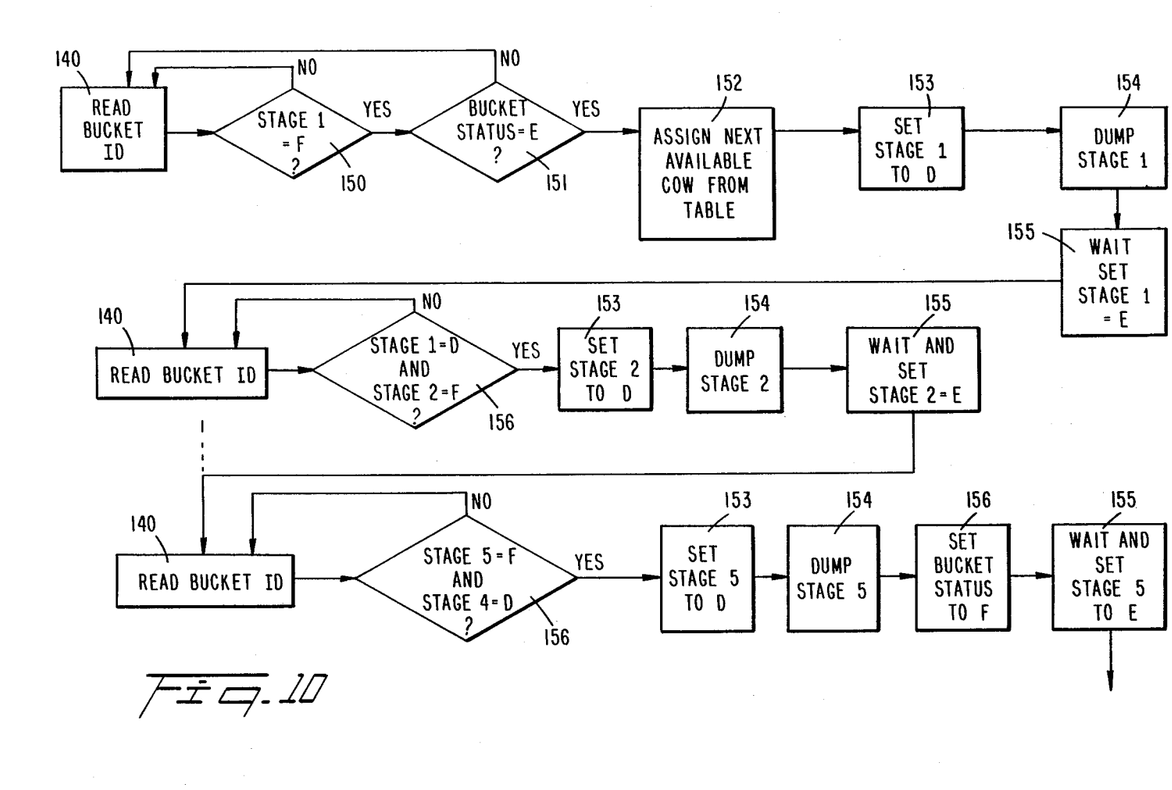
FIG. 10 shows the procedure for discharging the individualized ration mix to delivery buckets.

As shown at FIG. 10, as a bucket approaches the feed reservoir extracting mechanism its bucket identification number is read at step 140. For the specific feed reservoir stage it is then determined at step 150 whether the extractor status is F (i.e., full). If not the process continues to read bucket identifiers as the buckets approach the stage. Once the status identifier for the extractor is determined to be F at step 150, an affirmative exit leads to a further test at step 151 for the bucket status. If the bucket is not indicated as being empty the process repeats at step 140. If the bucket status is identified by E, i.e., if the bucket is empty, an affirmative exit results from step 151. Accordingly, it has been determined that a particular bucket is approaching the stage, that the extractor from the feed reservoir has been properly filled and that the approaching bucket is empty. Thus, at step 152 the particular bucket identifier is assigned to the next animal needing feed. That is, the bucket identification number is entered into the bucket number entry of the next stall record, thus assigning that particular bucket to the specified stall. At step 153 the status indicator for the extracting mechanism associated with the first feed reservoir is set to D and the extracting mechanism is discharged into the bucket at step 154. After an appropriate predetermined time period, the status of the extractor is returned to E, the time period having been chosen to suffice for the bucket to travel to the next feed reservoir extracting mechanism. Thus, as a bucket approaches any of the subsequent feed element stages, the bucket identification number is read and it is determined at step 156 whether the stage extracting mechanism status indicator is F and the previous stage status indicator is D. If either condition is not met the bucket identification number continues to be read for additional buckets. If both conditions are met, the steps 153, 154 and 155, common to each of the feed element stages, are performed. Thus, the stage indicator is set to D, the extracting mechanism dumped to the bucket, the predetermined time is counted and the status indicator reset to E. Once the bucket is filled with the last feed element, the bucket status indicator is set to F at step 156. Thus, for a specified bucket destined for a particular stall an indication is placed into the cow-feed table that the bucket is fully loaded and ready to discharge the ration to the stall.

An alternative approach which may be taken in order to reduce costs utilize only a single bucket location, approaching the first feed stage. In this variation of the inventive embodiment the station checks for a "bucket full" condition. If the result of the check is affirmative, the station prevents the five feed stages from filling so that the full bucket may then pass the dump stages, activating the dump mechanism, but dumping empty stage reserves. A possible penalty for the reduced costs associated with the alternative approach is a lengthening of the feed cycle.

Figure 11:
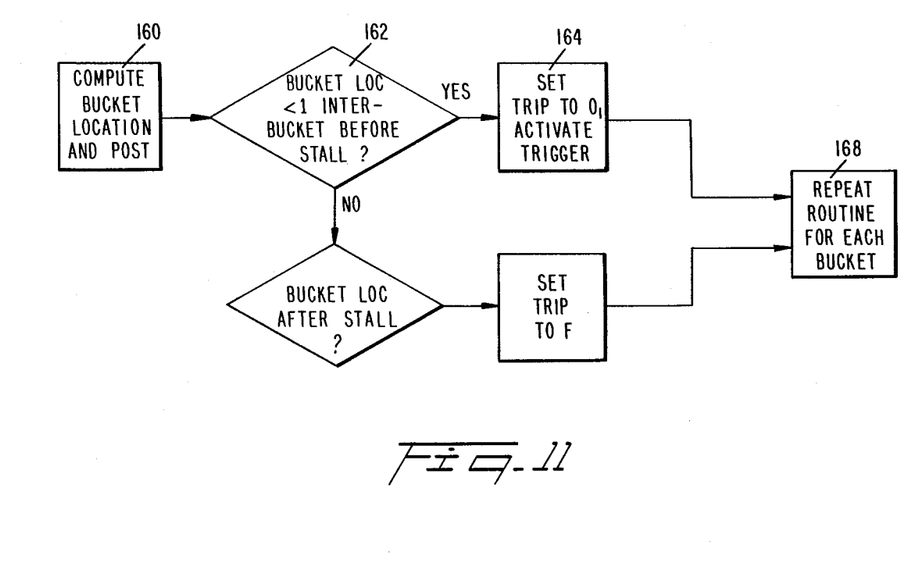
FIG. 11 shows the procedure for tripping and dumping the buckets at appropriate stalls.

At FIG. 11 there is shown a sequence of steps performed by the system in order to trip the buckets at the appropriate stall and to dump the contents thereof. In that regard the system includes a stored bucket location table in which the bucket location for each of the individual buckets is maintained. The buckets are spaced apart from one another by a predetermined inter-bucket distance, e.g., 20 feet. Thus, when the position of bucket number 1 is known (D, for example) the positions of each of the remaining buckets is similarly known as D-20(K-1) where K is the bucket identifying number. Thus, at step 160 the location of the bucket is determined either from the various location identifiers 44, or from a computation relative to the first bucket, said location being posted to a location table. At step 162 it is determined whether the bucket is at a distance before the receiving stall which is less than the inter-bucket distance. If the result of the inquiry in step 162 is affirmative, the trip indicator is set to 0 and trigger activated. If the result of step 162 is negative, that is the bucket is more than one inter-bucket distance before the target stall or has passed the target stall therefor, the trip indicator of the target stall is set to F at step 166 (trigger off), thus avoiding discharge of a wrong bucket.

The routine of FIG. 11 is repeated (step 168) until all buckets are empty, and the amounts of each element feed to each animal is stored and deducted from a feed element inventory table maintained in the computer.

Accordingly, it is seen that in the present invention feed is provided according to changes in condition and in activity. For example, a change in ratio is provided when different forage is used, resulting in a different balance of forage and supplements. On the other hand, a change in amount of feed is dictated as an animal moves through different stages of lacation and gestation. Such computations are thus helpful in providing a feed list for purchase by a farmer or in providing control signals for a storage and delivery system, including a manual override option.

The present invention thus advantageously permits variation of feeding frequency, by assigning additional buckets to a stall, and variation of storage and feeding of individual components, separately or combined into a premix or a total mixed ration. Moreover, data may be manually input to inform the controller that an individual animal has been relocated, i.e., moved to another stall, so that the appropriate feed information will track such movements as necessary.

Although a preferred embodiment of the invention has been described, this embodiment is provided by way of illustration and not limitation. Different embodiments, incorporating modifications and variations from the foregoing embodiment, as will occur to those of ordinary skill in the art are within the scope of the present invention which is defined by the claims appended hereto.

I claim:

1. Feeding apparatus for providing feed rations to livestock comprising:
   feed combining means;
   feed delivering means;
   programmable control means outputting first signals
      for controlling said feed combining means to provide a specified mix of feed elements in accordance with identification data for specific livestock;

said feed combining means connected to receive said first signals from said programmable control means and operable responsively thereto for combining selected quantities of selected feed elements to form said specified mix and for providing said specified mix to said feed delivering means;

said programmable control means outputting second signals for controlling said feed delivering means to deliver said specified mix to the specific livestock;

said programmable control means including storage means for storing data correlating specific livestock identification and specified feed mixes.

2. Feeding apparatus as recited in claim 1 wherein said feed delivering means is operable for delivering said specified feed mix to a specific stall housing the specific livestock in accordance with said data stored in said storage means.

3. Feeding apparatus as recited in claim 1 further comprising first input means for inputting status data representative of status of the specific livestock and wherein said programmable control means includes means responsive to said status data for setting said specified mix in accordance with said status and for generating said first signals corresponding thereto.

4. Feeding apparatus as recited in claim 3 wherein said programmable control means further includes timing means for determining time responsive change in said status data, means for changing said specified mix in accordance with said changed status data, and means for producing said first signals changed in accordance with said time responsive change, whereby different feed rations are provided for livestock in accordance with time changed conditions.

5. Feeding apparatus as recited in claim 3 further comprising second input means having manually controlled signal generating means for providing manually determined override data and said programmable control means comprises override means for setting said specified mix responsive to said override data independently of said status data.

6. Apparatus for providing a specified ration to a specific stall comprising:
   delivering means;
   programmable control means programmed for outputting signals for controlling said delivering means to deliver said specified ration to the specific stall;
   said delivering means including:
      container means for receiving said specified ration and movable among a plurality of stalls for delivering said specified ration only to said specific stall,
      motive means connected for receiving said signals from said programmable control means and for moving said container means to a first location to receive said specified ration and to a second location including the stalls, and
      discharge control means responsive to said signals from said programmable control means for discharging said container means of said specified ration only at said specific stall.

7. Apparatus as recited in claim 6 further comprising combining means;
   said programmable control means outputting additional signals for controlling said combining means to provide a specified combination of elements to form specified rations in accordance with identification data for specific stalls;
   said combining means connected to receive said additional signals from said programmable control means and operable responsively thereto for combining selected quantities of selected elements to form said specified ration and for providing said specified ration to respective ones of said delivering means.

8. Apparatus as recited in claim 7 wherein said programmable control means includes storage means for storing identification data correlating specific stall identification and specified rations.

9. Apparatus as recited in claim 8 wherein said delivering means is operable for delivering said specified ration to a specific stall in accordance with said identification data stored in said storage means.

10. Apparatus as recited in claim 8 further comprising first input means for inputting status data representative of status of contents of the specific stall and wherein said programmable control means includes means responsive to said status data for setting said specified ration in accordance with said status and for generating said signals corresponding thereto.

11. Apparatus as recited in claim 10 further comprising second input means having manually controlled signal generating means for providing manually determined override data and said programmable control means comprises override means for setting said specified ration responsive to said override data independently of said status data.

12. Apparatus as recited in claim 10 wherein said programmable control means further includes additional input means connected to receive timed status change signals representative of time responsive change in said status data, means for changing said specified ration in accordance with said changed status data, and means for producing said signals changed in accordance with said time responsive change, whereby different rations are provided to a specific stall in accordance with time changed conditions.

13. Apparatus as recited in claim 12 wherein said programmable control means is connected to management computer means, said management computer means including means for storing time changing conditions of contents of said stalls and timing means for generating said timed status change signals for provision to said additional input means of said programmable control means.

14. Apparatus for providing individually specified total mix rations to respective specific stalls comprising:
   delivering means;
   programmable control means programmed for outputting signals for controlling said delivering means to deliver said specified rations to the respective stalls;
   said delivering means including:
      a plurality of container means each operable for receiving one of said specified rations and movable among the stalls for delivering said one specified ration only to the respective stall,
      motive means connected for receiving said signals from said programmable control means and for moving each of said container means to a first location to receive said respective individually specified rations and to a second location including the stalls, and discharge control means responsive to said signals from said programmable control means for discharging said respective individually specified rations from said container means only at said respective specific stalls.

15. Apparatus as recited in claim 14 further comprising combining means;
    said programmable control means outputting additional signals for controlling said combining means to provide a specified combination of elements to form specified rations in accordance with identification data for specific stalls;
    said combining means connected to receive said additional signals from said programmable control means and operable responsively thereto for combining selected quantities of selected elements to form said specified rations and for providing said specified ration to respective ones of said plural container means.

16. Apparatus as recited in claim 15 wherein said combining means comprises at said first location a plurality of reservoir means each storing individual feed elements for forming said individually specified rations.

17. Apparatus as recited in claim 16 wherein said combining means further includes a plurality of primary discharge mechanisms respectively connected to said plurality of reservoir means for discharging individually specified quantities of the feed elements into each of said plurality of container means.

18. Apparatus as recited in claim 17 wherein said plurality of primary discharge mechanisms each includes means for weighing a quantity of the respective feed elements and for dumping the feed element into the container means when the quantity thereof equals the individually specified quantity.

19. Apparatus as recited in claim 16 further comprising filling means for filling said plurality of reservoir means with fresh feed elements,
    said filling means operable for filling said reservoir means in accordance with amounts of said feed elements needed by animals feeding at said stalls,
    thereby assuring delivery of fresh feed rations to said stalls.

20. Apparatus as recited in claim 14 wherein said discharge control means further comprises means for determining location of said plurality of containing means as a function of intercontainer distances therebetween and for discharging a container means when the computed location thereof corresponds to a location of a respective specific stall therefor.

* * * * *